(12) United States Patent  
Miceli

(10) Patent No.: US 7,499,075 B2  
(45) Date of Patent: Mar. 3, 2009

(54) VIDEO CONFERENCE CHOREOGRAPHER

(75) Inventor: Sean Miceli, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 613 days.

(21) Appl. No.: 10/952,053

(22) Filed: Sep. 28, 2004

(65) Prior Publication Data  
US 2006/0066717 A1    Mar. 30, 2006

(51) Int. Cl.  
H04N 7/14 (2006.01)  
G06F 3/00 (2006.01)

(52) U.S. Cl. .............. 348/14.09; 348/14.08; 348/14.12

(58) Field of Classification Search ... 348/14.01–14.09, 348/14.1, 14.11, 14.12, 14.13, 14.16; 370/260, 370/261; 715/753, 755, 751  
See application file for complete search history.

(56) References Cited

U.S. PATENT DOCUMENTS

| 5,745,161 | A | 4/1998 | Ito |
| 5,764,277 | A | 6/1998 | Loui et al. |
| 6,202,084 | B1 * | 3/2001 | Kumar et al. ............... 709/204 |
| 6,285,661 | B1 | 9/2001 | Zhu et al. |
| 6,553,150 | B1 * | 4/2003 | Wee et al. .................. 382/243 |
| 6,583,806 | B2 | 6/2003 | Ludwig et al. |
| 6,973,625 | B1 * | 12/2005 | Lupo et al. ................. 715/762 |
| 7,084,898 | B1 * | 8/2006 | Firestone et al. ......... 348/14.09 |
| 7,362,349 | B2 | 4/2008 | Nelson et al. |
| 2002/0064136 | A1 | 5/2002 | O'Neil |
| 2003/0117486 | A1 | 6/2003 | Ferren et al. |
| 2004/0008249 | A1 * | 1/2004 | Nelson et al. ............. 348/14.09 |

FOREIGN PATENT DOCUMENTS

| JP | 40623392 A | * | 8/1994 |
| JP | 10-164539 | * | 6/1998 |
| JP | 410271474 A | * | 10/1998 |
| JP | 2004-72741 A |   | 3/2004 |

* cited by examiner

Primary Examiner—Melur Ramakrishnaiah

(57) ABSTRACT

A videoconference system is provided. The videoconference system includes a plurality of clients. A server component configured to distribute media to the plurality of clients is included. The server component includes a media mixer enabling distribution of a composite audio/video data stream to the client component and a videoconference choreographer configured to assist the media mixer in mixing input streams to the server component based upon event data. A conference channel communication connection over which video and audio data streams are carried between the plurality of clients and the server component is provided. A back-channel communication connection over which the event data is communicated between the plurality of clients and the server component is also included. A method for controlling mixing of data streams for a videoconference session is also provided. A scheme for converting documents to be shared during a videoconference session to a common format is also provided.

16 Claims, 5 Drawing Sheets

VIDEO CONFERENCE CHOREOGRAPHER

CROSS REFERENCE TO RELATED APPLICATIONS

This application is related to U.S. patent application Ser. No. 10/440,526, filed on May 16, 2003, and entitled "Annotation Management System," and U.S. patent application Ser. No. 10/192,080, filed on Jul. 10, 2002, and entitled "Multi-Participant Conference System with Controllable Content Delivery Using a Client Monitor Back-Channel." These applications are hereby incorporated by reference in their entirety for all purposes.

BACKGROUND OF THE INVENTION

1. Field of the Invention

This invention relates generally to videoconferencing systems and more particularly to videoconference choreographer configured to control the video layout and mixing of outgoing video streams for a videoconference session.

2. Description of the Related Art

Conferencing devices are used to facilitate communication between two or more participants physically located at separate locations. Devices are available to exchange live video, audio, and other data to view, hear, or otherwise collaborate with each participant. Common applications for conferencing include meetings/workgroups, presentations, and training/education. Today, with the help of videoconferencing software, a personal computer with an inexpensive camera and microphone can be used to connect with other conferencing participants. The operating systems of some of these machines provide simple peer-to-peer videoconferencing software, such as MICROSOFT'S NETMEETING application that is included with MICROSOFT WINDOWS based operating systems. Alternatively, peer-to-peer videoconferencing software applications can be inexpensively purchased separately. Motivated by the availability of software and inexpensive camera/microphone devices, videoconferencing has become increasingly popular. As videoconferencing software has gained popularity, more and more companies are turning to virtual meetings conducted over the web to cut costs of flying employees to meet face to face. A company can now share vital information and documents with potential clients in any part of the world with a click of a button.

A shortcoming associated with video conferencing units is the ability for a participant to dynamically configure the layout for the videoconference session that is being viewed by the other participants. Currently, participants are limited to static predefined layouts. These predefined layouts place a minimum burden on the videoconference server, as the server is already burdened with mixing the video streams for each participant. However, each user is limited to the predefined layouts. Thus, this "one size fits all" approach minimizes the overhead for the videoconference server at the expense of flexibility for the participants.

Another shortcoming with the videoconference applications currently available is that if one of the clients in the conference wants to share a document that is in a proprietary format, not all the other clients in the conference may have software able to view this document. A common solution is to develop client software that is capable of reading this format. However, the developing company may have to pay large licensing fees to do so, which may not be feasible to a small business or a company with a limited budget.

Another common problem is how to distribute documents to all the clients in a conference, especially if the document is very large and contains multiple pages. Distributing the document to everyone at the same time may use a lot of the network's bandwidth, adversely affecting other aspects of the conference, such as audio and video. Furthermore, depending on how many pages of the multi-page document are presented in the meeting, distributing the entire document to every client may not be necessary.

As a result, there is a need to solve the problems of the prior art to provide a method and system for enabling participants to dynamically select display layouts without burdening the videoconference server, as well as expeditiously upload and distribute documents during a videoconference session.

SUMMARY OF THE INVENTION

Broadly speaking, the present invention fills these needs by providing a method and system for enabling the participants to customize and control a video display layout in real-time for a videoconference session. It should be appreciated that the present invention can be implemented in numerous ways, including as a process, a system, a computer readable media, or a graphical user interface. Several inventive embodiments of the present invention are described below.

In one embodiment, a videoconference system is provided. The videoconference system includes a plurality of clients. A server component configured to distribute media to the plurality of clients is included. The server component includes a media mixer enabling distribution of a composite audio/video data stream to the client component and a videoconference choreographer configured to assist the media mixer in mixing input streams to the server component based upon event data. Exemplary event data includes a mouse click, a size change signal, a participant joining a conference session, or a participant leaving the conference session. A conference channel communication connection over which video and audio data streams are carried between the plurality of clients and the server component is provided. A back-channel communication connection over which the event data is communicated between the plurality of clients and the server component is also included.

In another embodiment, a videoconferencing system enabling participants to customize a collaboration model is provided. The videoconference system includes a server component. The server component includes a videoconference choreographer. The videoconference choreographer is configured to control mixing of input streams of a videoconference session. The videoconference choreographer is further configured to adjust compression of a data stream transmitted from the server component based upon bandwidth limitations. The videoconference system includes a client configured to execute application software enabling selection of a script to be communicated to the server component. The selection of the script dictates a collaboration model followed by the videoconference session.

In yet another embodiment, a method of controlling the mixing of data streams for a videoconference session is provided. The method initiates with triggering initialization of a script controlling positions of display objects within a data stream to be distributed to videoconference clients. Then, an event is detected. In response to detecting the event, the display objects are manipulated.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
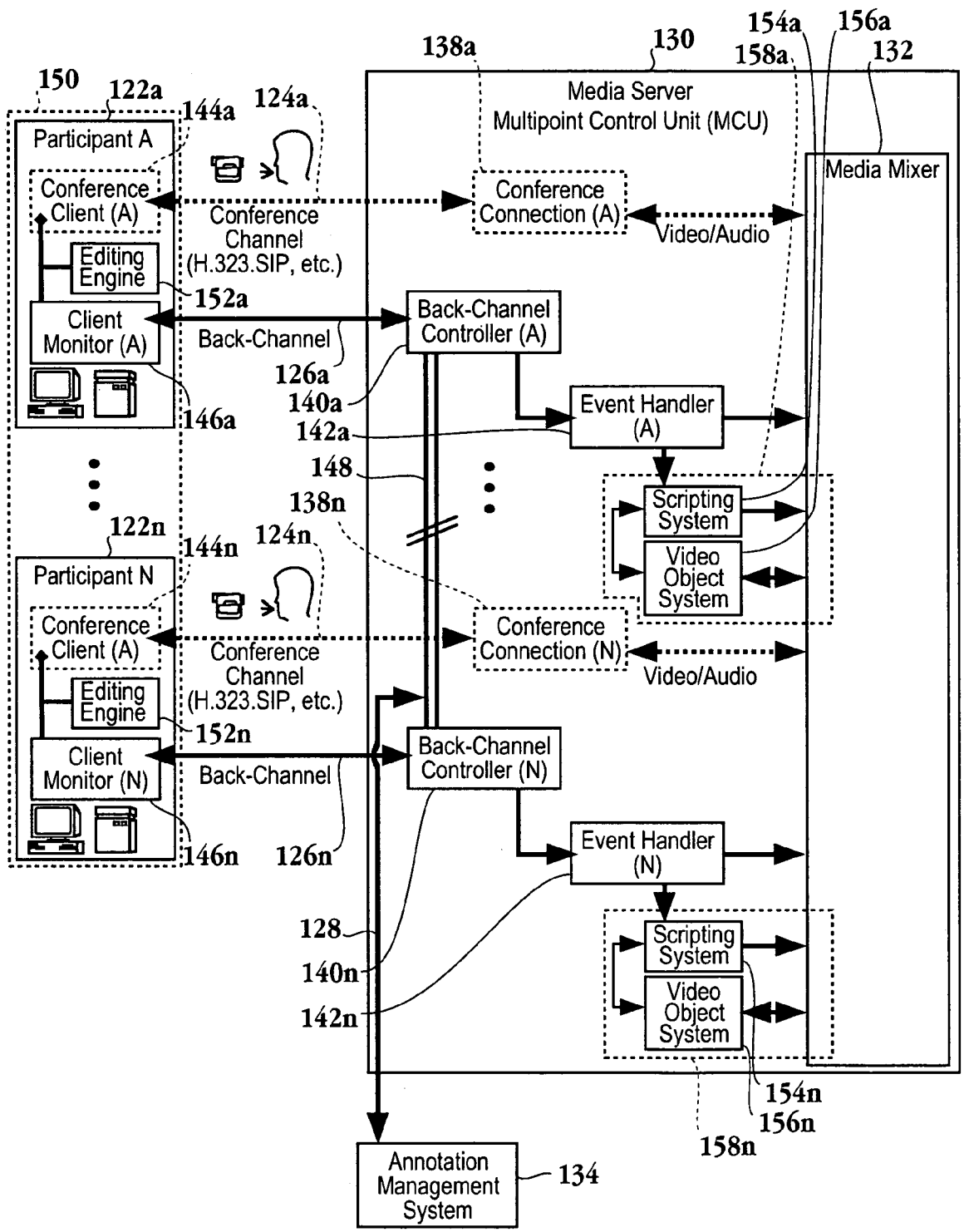
FIG. 1 is a schematic diagram illustrating the components for a multi-participant conference system using a client monitor back-channel and having a videoconference choreographer in accordance with one embodiment of the invention.

An invention is described for an apparatus and method for videoconference choreographer configured to enable clients of a videoconference session to individually and dynamically customize display layouts. The system further provides a scheme for distributing documents to videoconference participants in an efficient manner. It will be apparent, however, to one skilled in the art, in light of this disclosure, that the present invention may be practiced without some or all of these specific details. In other instances, well known process operations have not been described in detail in order not to unnecessarily obscure the present invention.

The embodiments of the present invention provide a method and system for enabling real-time customizable presentation layouts viewed by participants of a videoconference system through a videoconference choreographer. The videoconference choreographer is an event based scripting language for controlling the mixing of various input streams of a videoconference session. The streams may be video, audio, or some other suitable input stream, such as closed captioning. The events are an occurrence of some predefined happening that triggers a sequence of actions in the scripting language. Examples of events include when a new participant is connected to the meeting or when a participant leaves the meeting. Additional events include when a key is pressed on a keyboard to change the view presented to the participants, such as to show only a slide of a Power Point presentation, or a mouse click. In one embodiment, an event may be a command input by a gesture that is detected in the video stream or a voice command detected in the audio stream.

Besides managing or controlling of the input streams, the videoconference choreographer is configured to efficiently use of the resources of the videoconferencing server. The videoconferencing server mixes each incoming stream into one outgoing stream for each participant. This is done in as close to real-time as possible. It should be appreciated that the delay caused by this mixing has to be small to allow for communication between participants to seem life-like, i.e., real-time. If the delay becomes too large communication will become increasingly difficult. Therefore, the videoconferencing choreographer is configured to not place heavy demands on the server. Accordingly, the embodiments described herein do not take an exorbitant amount of time for execution.

Three exemplary areas in which the videoconference choreographer can be used to optimize include 1) the use of the server, 2) choice of appropriate scaling method, and 3) to control the mixing to efficiently utilize the video encoder. In one embodiment, to most efficiently use the server, the script ensures that there is a proper balance of what is executed by the choreographer and what is executed in native code as part of the normal operation of the videoconferencing server. For example, the videoconferencing system, through the media mixer, mixes the video streams and the choreographer does not take over this responsibility. It is much faster for the videoconferencing system to perform the mixing than for the scripting language described herein to touch every data bit of the video streams to mix them. Thus, there is a division of responsibility between the choreographer and the conferencing system based upon the efficient utilization of the resources for each.

FIG. 1 is a schematic diagram illustrating the components for a multi-participant conference system using a client monitor back-channel and having a videoconference choreographer in accordance with one embodiment of the invention. The client component includes multiple participants, such as participant A 122a through participant N 122n. In this embodiment, each participant 122a-122n includes conference client 144a-n, editing engine 152a-n and client monitor (CM) 146a-n. Conference client A 144a may include the participant's peer-to-peer videoconferencing software or any proprietary videoconferencing software application. It should be appreciated that each participant may place calls to another participant, establish and disconnect a conferencing session, capture and send content, receive and playback the content exchanged, etc. Calls from each of the conference clients route through media transport server 130. That is, the participants use their associated conference client to place calls to media transport server 130 to join the conference. In one embodiment, conference client A 144a includes a high-level user-interface for the conference, such as when the conference client is a pre-existing software application. For example, one such product that provides peer-to-peer videoconferencing is the NETMEETING application software from MICROSOFT Corporation.

CM 146a is configured to monitor conference client A 144a. That is, CM 146a looks at how a user is interacting with the software application by monitoring a video display window of client A 144a in one embodiment. In addition, CM 146a interprets the users interactions in order to transmit the interactions to the server component. In one embodiment, each CM is configured to provide four functions. One function of the CM is to monitor the start/stop of a conference channel so that a back-channel communication session can be established in parallel to a conference channel session between the participant and the server component. A second function monitors events, such as user interactions and mouse messages, within the video window displayed by conference client 144. A third function handles control message information between the CM 146 and a back-channel controller 140 of the server component. A fourth function provides an external user-interface for the participant that can be used to display and send images to other conference members, show the other connected participants names, and other communication information or tools.

As mentioned above, the client monitor watches for activity in the associated conference client. In one embodiment, this includes monitoring user events over the video display region containing the conference content, and also includes the conference session control information. For example, the CM watches for the start and end of a conference session or a call from the conference client. When conference client 144a-n places a call to media transport server 130 to start a new conference session, CM 146a-n also places a call to the media transport server. The call from CM 146a-n establishes back-channel connection 126a-n for the participant's conference session. Since the CM can monitor the session start/stop events, back-channel connection initiates automatically without additional user setup, i.e., the back-channel connection is transparent to a user. Accordingly, a new session is maintained in parallel with conference client activity. It should be appreciated that conference channels 124a-124n provide a video/audio connection between associated conference client 144a-n and respective conference connection 138a-n of media transport server 130. In one embodiment, conference channel 124a-n provides a communication link for real-time video/audio data of the conference session communicated between the client component and the server component.

The client monitor may specifically monitor activity that occurs over the conference's video frame displayed by the conference client. For example, CM 146a-n may monitor the video image in MICROSOFT'S NETMEETING application. Mouse activity in the client frame is relayed via protocol across back-channel connection 126a-n to media transport server 130. In turn, back-channel controller 140a-n can report this activity to another participant, or event handler 142a-n for the respective participant. In this embodiment, the monitoring of conference client 144 occurs through a hook between the operating system level and the application level. As mentioned above, the video window can be watched for mouse clicks or keyboard strokes from outside of the videoconferencing application. Alternatively, proprietary videoconferencing application software may be provided which integrates the client monitor functionality to provided relevant information to a back-channel network.

In another embodiment, the CM can present a separate user-interface to the participant. This interface can be shown in parallel to the user interface presented by the conference client and may remain throughout the established conference. Alternatively, the user interface presented by the CM may appear before or after a conference session for other configuration or setup purposes.

In yet another embodiment, the CM may provide an interface for direct connection to a communication session hosted by media transport server 130 without need for a conference client. In this embodiment, the CM presents a user interface that allows the back-channel connection to be utilized to return meeting summary content, current meeting status, participant information, shared data content, or even live conference audio. This might occur, for instance, if the participant has chosen not to use the conference client because the participant only wishes to monitor the activities of the communication. It should be appreciated that the client component can be referred to as a thin client in that the conference client performs minimal data processing. In short, any suitable videoconference application may be included as conference client 144a-n. As previously mentioned, CM 146a is configured to recognize when the videoconference application of conference client A 144a starts and stops running, in turn, the CM can start and stop running as the conference client does. CM 146a can also receive information from the server component in parallel to the videoconference session.

For example, CM 146a may allow participant A 122a to share an image during the conference session. Accordingly, the shared image may be provided to each of the client monitors so that each participant is enabled to view the image over a document viewer rather than through the video display region of the videoconference software. As a result, the participants can view a much clearer image of the shared document. In one embodiment, a document shared in a conference is available for viewing by each of the clients.

Editing engine 152a is also included in participant A 122a. Editing engine 152a includes the functionality provided for enabling the corresponding participant to customize the display layout and communicate the customization of the display layout through back channel 126a. For example, a graphical user interface allowing this customization may be presented to the participant through editing engine 152a. The editing engine allows a participant to customize or choreograph a meeting beyond what is provided natively with the videoconference system. The editing engine further allows for the creation of custom events and actions. The editing engine defines these events and actions in the scripting language and the generated script is then communicated through the back channel to the scripting system.

The server component includes media transport server 130, which provides a multi-point control unit (MCU) that is configured to deliver participant customizable information. It should be appreciated that media transport server 130 and the components of the media transport server are software code configured to execute functionality as described herein. In one embodiment, media transport server 130 is a component of a hardware based server implementing the embodiments described herein. Media transport server 130 includes media mixer 132, back-channel controller 140a-n, and event handler 142a-n. Media transport server 130 also provides conference connection 138a-n. More specifically, conference connection A 138a completes the link allowing the videoconferencing software, e.g., a peer-to-peer videoconferencing application, of conference client A 144a to communicate with media transport server 130. That is, conferencing connection A 138a emulates another peer and performs a handshake with conference client A 144a, which is expecting a peer-to-peer connection. In one embodiment, media transport server 130 provides Multipoint Control Unit (MCU) functionality by allowing connections of separate participants into selectable logical rooms for shared conference communications. As an MCU, media transport server 130 acts as a "peer" to a conference client, but can also receive calls from multiple participants. One skilled in the art will appreciate that media transport server 130 internally links all the participants of the same logical room, defining a multi-participant conference session for each room, with each peer-to-peer conference client operating with the media hub only as a peer. As mentioned above, media transport server 130 is configured to conform to the peer requirements of the associated conference client. For example, if the conference clients are using H.323 compliant conference protocols, as found in applications like MICROSOFT'S NETMEETING, media transport server 130 must also support the H.323 protocol. In other words, the conference communication can occur via H.323 protocols, Session Initiated Protocols (SIP), or other suitable APIs that match the participant connection requirements.

Still referring to FIG. 1, media mixer 132 is configured to assemble audio and video information specific to each participant from the combination of all participants' audio and video, the specific participant configuration information, and server user-interface settings. Media mixer 132 performs multiplexing work by combining incoming data streams, i.e., audio/video streams, on a per participant basis. In one embodiment, media mixer 132 includes a video layout processor and an audio distribution processor that assemble the conference signals. A client monitor-back-channel network allows media transport server 130 to monitor a user's interactions with conference client 144a-n and to provide the appearance that the peer-to-peer software application has additional functionality. The additional functionality adapts the peer-to-peer functionality of the software application, executed by conference client 144a-n, for the multi-participant environment described herein. Here, customization of the participant's view is communicated through the corresponding editing engine 152a-n and communicated through the client monitor-back-channel network. The client monitor-back-channel network includes client monitor 146, back-channel connection 126, back-channel controller 140, event handler 142, and videoconference choreographer 158.

Back-channel connections 126a-126n are analogous to a parallel conference in addition to conference channels 124a-124n, respectively. Back-channel controllers (BCCs) 140a-140n maintain the communication link from each associated client monitor. Protocols defined on the link are interpreted at media transport server 130 and passed to the appropriate destinations, i.e., other participant's back-channel controllers, event handler, or back to the CM. Each of the back-channel controllers 140a-140n is in communication through back-channel controller communication link 148.

Videoconference choreographer 158a-n includes the script for controlling the mixing of the input streams according to signals received from respective editing engines 152a-n through the corresponding client monitor-back-channel network. Scripting system 154a-n includes the scripting language that is associated with an event. Here, an event, such as the events listed above, will occur and the actions associated with that event will be triggered. In one embodiment, videoconference choreographer 158a-n associate the actions with certain events as illustrated through the following pseudo code:

```
Event1   { actions }
Event2   {
              Action1
              Action2
              ...
              ActionN
         }
...
EventN   { actions }
```

It should be appreciated that the syntax of the language is not as important as that the language functionally allows for events to be associated with the appropriate actions.

Videoconferencing choreographer 158a interacts with the internals of the videoconferencing system, i.e., media mixer 132. Videoconferencing choreographer 158a does this through what is typically called a foreign function interface. This interface allows the calling code in the videoconferencing system to add data structures, objects, and functions to the scripting language. In turn, this allows videoconference choreographer 158a to manipulate the internal structures of the videoconferencing system. For example, the videoconferencing system may use the foreign function interface to export an object that contains a list of participants and the functions that can be used to access and change the location of where each participant is displayed in the output video stream.

Typically a scripting language can be divided up into two sections, the front end and the back end. The front end is responsible for parsing the scripting language into an internal form. The back end is used to take the internal form and translate it into a form that can be interpreted, compiled into byte code, or even straight into machine code. It should be appreciated that with the embodiments described herein, each of videoconferencing choreographer 158a-n, can make use of video hardware to implement some or all of its functionality. Accordingly, with respect to the newer generation of video cards that implement nVIDIA's Cg language or MICROSOFT's HLSL language in Direct X 9, the mixing of incoming video streams can happen on the graphics card, off-loading some of the computation from the main processor.

As mentioned above, exemplary areas in which the videoconference choreographer can be utilized include the use of the server, choice of appropriate scaling method, and to control the mixing to efficiently utilize the video encoder. The scaling system of a videoconferencing system can cache the current frame of the video stream to make the frame useable for different output streams going to different participants, as it is common for different output streams to need the same incoming frame at the same scale as another output stream. This caching greatly reduces the amount of processor time used to process a frame of video. However, if the presentation of the videoconference controlled by the videoconference choreographer is very dynamic, such as animating the movement of one participant to another in the videoconference, then the caching that the scaling system is using can be invalidated. At this point, to keep the processor time to a minimum, it would be desirable to change to a faster but visually less appealing scaling algorithm. This would be appropriate, as the reduced quality of the scaling would not be noticed as the area of concern is in motion and the quality of video is much harder for a person to quantify when in motion. The videoconference choreographer can make use of this information to switch scaling algorithms when there is motion.

The outgoing video stream to the conference participants needs to be encoded to the appropriate format for each participant's video conferencing client. This encoding process usually is what takes the most time for the video conferencing server to process. Each frame of the stream needs to be encoded. The encoder can do an acceptable job if there are not many changes between each frame. If there are many changes it is difficult and takes more processing time to do an acceptable job compressing the frame into the encoding format. Thus, to get better encoding, the videoconference choreographer can make as little changes to each frame as possible in one embodiment. To optimize this process, the videoconference choreographer allows only small motions between frames that the encoder can easily find and encode. In another embodiment, the videoconference choreographer can also limit the motion between frames to allow the encoder to better compress most frames. For example, this can occur when animating the movement from one position in the outgoing video stream to another. For fast processing, the videoconference choreographer might allow no animation between these two positions. However, if there is adequate time to perform the processing and the outgoing connection has enough bandwidth, performing an animation of moving from the original position to the desired position can be executed.

Videoconferencing choreographer 158a-n is configured to ascertain what part of the outgoing video stream is of highest importance. In one embodiment, this information can be passed on to the encoder if the encoder supports encoding different areas of the outgoing streams at different qualities. For example, the main speaker may be given the best quality, while slightly limiting the quality of the other visible participants. Alternatively, the videoconferencing choreographer can be used to reduce the quality of video areas that are in motion, such as animating the placement of a participant's video from one location to another.

Videoconferencing choreographer 158a-n is also configured to consider the outgoing bandwidth of the network connection. If the bandwidth is relatively low, then it is best to get higher compression. Thus, a poor quality scale algorithm (which might compress better) might be chosen where the bandwidth is relatively low. In addition, the animation might be limited as discussed above. Alternatively, where the bandwidth is relatively high, a higher quality scale algorithm may be applied. In one embodiment, a relatively low bandwidth is less than about 100 bits per second (bps), while a relatively high bandwidth is greater than about 200 bps. It should be appreciated that these bandwidths are exemplary and not meant to be limiting as the low and high bandwidth rates depend upon what is being transmitted across the channel. For example, with respect to a medical application even 200 bps would be considered a very low bandwidth.

Videoconference choreographer 158a-n may be used to control the video layout that participants see in their respective client. Thus, the videoconference choreographer can be used to control the collaboration model of the conference session. The collaboration model can also be a one to one meeting, similar to a phone call with the addition of the video. It can also be many to many, such as a department meeting. Alternatively, the collaboration model can be one to many, such as a teacher teaching a class using the video conferencing system, or the president of a company delivering an announcement to his company with many offices spread around the world. In one embodiment, the videoconference choreographer can be used to provide the optimal video layout for each collaboration model. For example, events such as, mouse or keyboard events triggered through the editing engine or server based events enable the videoconference choreographer to handle the user interface of the video window on the client. It should be noted that the videoconference choreographer is not limited to only handling the layout. The videoconference choreographer may also be used to make adjustments to scaling and consider bandwidth limitations as discussed herein.

The components of videoconference choreographer 158a-n include scripting system 154a-n and video object system 156a-n, respectively. Scripting system 154a-n includes the script that is triggered or selected through events communicated from editing engine 152a-n through the back channel network. Scripting system 154a-n directs media mixer 132 according to the selected script, such as the exemplary script listed below. Additionally, scripting system 154a-n may control scaling and encoding operations dependent on bandwidth as discussed herein. Video object system 156a-n store corresponding video objects that are manipulated by the script instructions. Thus, video object system 156a-n may be thought of as a database of video display objects that is accessed by both media mixer 132 and scripting system 154a-n. In one embodiment, the script manipulates the position of the video display objects and the media mixer recognizes that the position of the objects have changed and performs the scaling accordingly. As mentioned above, the media mixer performs the scaling as directed by a script in one embodiment.

In another embodiment, the videoconference choreographer can be used to control the presentation. This could allow a coordinator of the meeting to change the collaboration model of the meeting on the fly, such as having a main speaker give a presentation and then switching the collaboration model to one that enables a discussion of that presentation. The presenter gets control over what each participant sees, such as at the press of a key switching to a close up of a slide in a presentation and switching back to a single view of the speaker, or switching to a view of the speaker and the participant asking a question.

An exemplary script of scripting system 154a-n that is configured to display one main participant and at full size and up to three participants scaled and superimposed at the bottom of each participants client video window is provided below:

```
Init
{
    numPos = 4
    marginx = 10
    marginy = 10
    connToMaximize = -1
}
AddConnection
{
    RecalcDisplay( )
}
NewConnection
{
}
SizeChange
{
    posnx[0] = 0
    posny[0] = 0
    posnw[0] = frameWidth
    posnh[0] = frameHeight
    posnx[1] = (frameWidth/2 - (frameWidth/5)/2)/2 -
            (frameWidth/5)/2
    posny[1] = frameHeight - frameHeight/5 - marginy
    posnw[1] = frameWidth/5
    posnh[1] = frameHeight/5
    posnx[2] = frameWidth/2 - (frameWidth/5)/2
    posny[2] = frameHeight - frameHeight/5 - marginy
    posnw[2] = frameWidth/5
    posnh[2] = frameHeight/5
    posnx[3] = frameWidth/2 + (frameWidth/5)/2 +
        (frameWidth/2 - (frameWidth/5)/2)/2 -
            (frame Width/5)/2
    posny[3] = frameHeight - frameHeight/5 - marginy
    posnw[3] = frameWidth/5
    posnh[3] = frameHeight/5
    RecalcDisplay( )
}
RemoveConnection
{
    RecalcDisplay( )
}
def RecalcDisplay( )
{
    s = connectionList.size( )
    if( s == 1 ) {
        connectionList[0].SetPos( 0, 0, frameWidth,
                frameHeight )
        DisplayList.BringToFront(connectionList[0])
        s = 0
    }
    if( s > 1 ) {
        i = 0
        while( i < s ) {
            connectionList[i].SetPos( posnx[i],
                    posny[i], posnw[i], posnh[i])
            if( i == 0 ) {
                DisplayList.BringToBack(
                            connectionList[ 0 ] )
            }
            else {
                DisplayList.BringToFront(
```

-continued

```
                    connectionList[ i ] )
        }
        i = i+1
    }
  }
}
MouseClick
{
  if(connToMaximize >= 0 || connectionList.size( ) <= 1) {
        connToMaximize = -1
        RecalcDisplay( )
  }
  else {
        GetConnectionHit( )
        connectionList[ connToMaximize ].SetPos( 0,
                        0, frameWidth, frameHeight )
                        DisplayList.BringToFront(
                                connectionList[
                        connToMaximize ])
  }
}
def GetConnectionHit( )
{
    i = DisplayList.size( )−1
    mx = (MouseX*frameWidth) / ExtentX
    my = (MouseY*frameHeight) / ExtentY
    while( i >= 0) {
        if( mx >= DisplayList[i].GetX( ) &&
                        my > DisplayList[i].GetY( ) &&
                        mx < DisplayList[i].GetX( )
                                + DisplayList[i].GetW( ) &&
            my < DisplayList[i].GetY( )
                                + DisplayList[i].GetH( ) ) {
                connToMaximize = i
                i = −1
        }
        i = i−1
    }
    if( connToMaximize > connectionList.size( ) ) {
        connToMaximize = connectionList.size( )
    }
}
```

An exemplary list of events handled by the above listed script handles the following events described below in TABLE 1.

TABLE 1

| | |
|---|---|
| Init | This event is execute once to allow the script to perform one time initialization |
| AddConnection | Executed when a connection has been added to the system and is receiving video |
| NewConnection | Executed when a connection is first connecting to the system, but before it is actually put into use |
| SizeChange | Executed when a clients video dimensions have been changed |
| RemoveConnection | Executed when a participant leaves the video conference |
| MouseClick | Executed when a mouse button has been pressed in the client's video window |

In one embodiment, the MouseClick event may not be a recognizable event for the videoconferencing clients. In this embodiment, a proprietary communication channel, e.g., a back channel, is included between the participant's system and the videoconferencing server to pass the event to the videoconference choreographer 158a-n.

As mentioned above, the videoconferencing system may use the foreign function interface to expose the frameWidth and frameHeight variables of the exemplary script to the videoconference choreographer. It should be appreciated that these variables are the width and height of the outgoing video frame being sent to a participant. Also exposed to the videoconference choreographer are connectionList and DisplayList. The connectionList is a list of all connections known to the videoconferencing system and the DisplayList is a list of all displayable objects that includes the connections in the connectionList. The DisplayList specifies the order that displayable objects are drawn. It should be noted that connectionList and DisplayList are lists of objects and each object has certain functions exported, such as setting the location of a participant's connection to be displayed, or changing the order for drawing by bringing an object to the front of the DisplayList. Referring to the MouseClick event, MouseX and MouseY for the location of the mouse at the time the mouse button was pressed are also exported.

The exemplary script also defines two functions, RecalcDisplay and GetConnectionHit. RecalcDisplay is called from the action list of an event to reposition each participant's connection to the appropriate location. GetConnectionHit takes the mouse location coordinates and returns the connection that includes the mouse coordinates. This connection is returned in the variable connToMaximize. This implementation of the MouseClick event maximizes the clicked on participant to the size of the full outgoing video frame. Alternatively, if a participant is already maximized, this event returns the view to normal.

Still referring to FIG. 1, in one embodiment, media transport server 130 provides a client configurable video stream containing a scaled version of each of the conference participants. A participant's event handler 142a-n in media transport server 130 is responsible for maintaining state information for each participant and passing this information to media mixer 132 for construction of that participants user-interface. In another embodiment, a server-side user-interface may also be embedded into the participant's video/audio streams. Further details on the architecture illustrated by FIG. 1 may be found in U.S. patent application Ser. No. 10/192,080, filed on Jul. 10, 2002, and entitled "Multi-Participant Conference System with Controllable Content Delivery Using a Client Monitor Back-Channel." It should be appreciated that FIG. 1 represents an exemplary architecture for a media transport server and the client component. It will be apparent to one skilled in the art that media transport server 130 may be based on any suitable architecture that includes the back-channel functionality. In addition, the client component may include any suitable client software configurations that enable a view of the videoconference session. The client software configurations may range from commercially available software packages, i.e., NETMEETING, to proprietary software configurations that may be downloaded to a client through a distributed network, such as the Internet.

Figure 2:
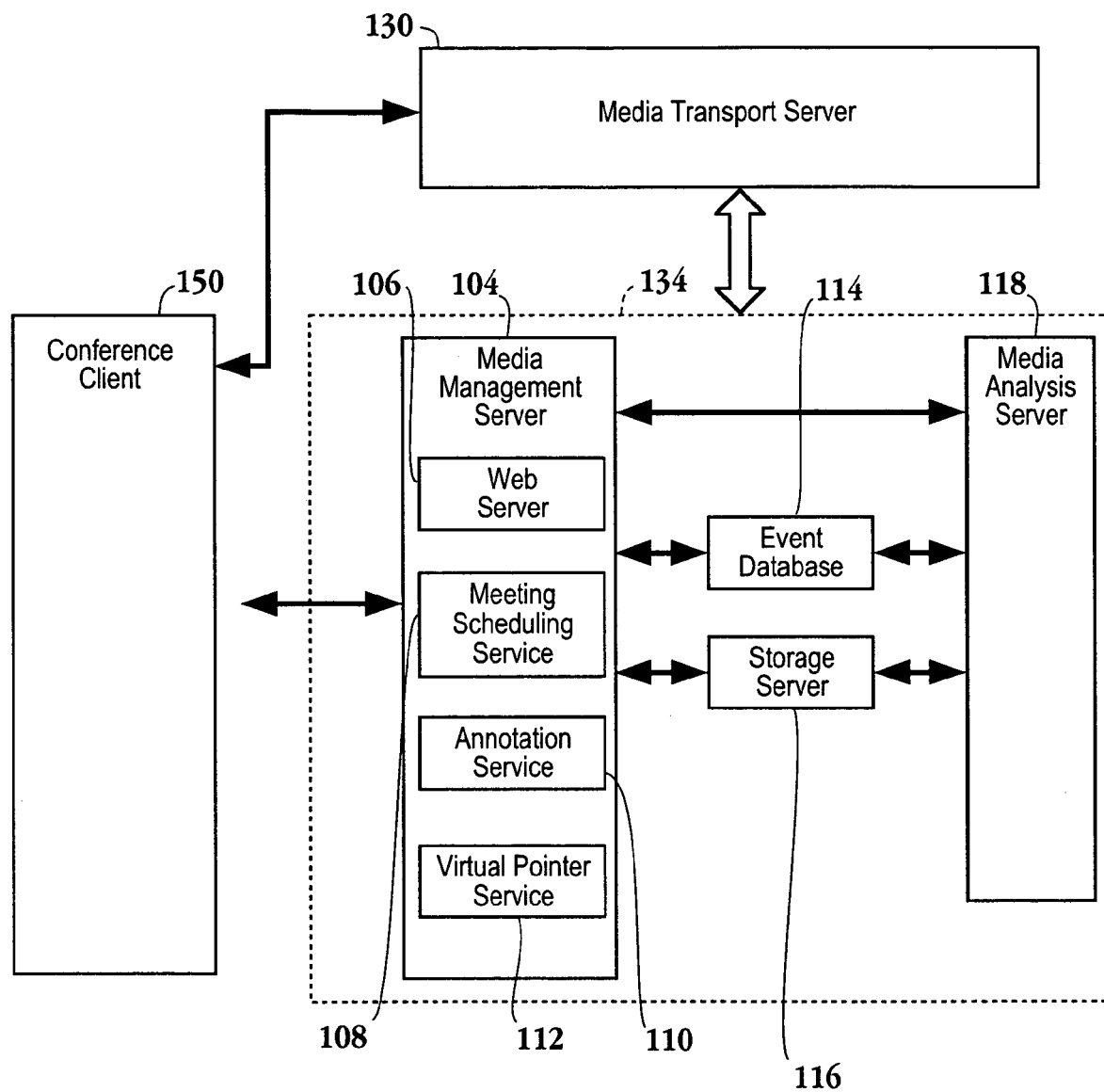
FIG. 2 is a simplified schematic diagram illustrating the relationship between modules of the annotation management system in accordance with one embodiment of the invention.

FIG. 2 is a simplified schematic diagram illustrating the relationship between modules of the annotation management system in accordance with one embodiment of the invention. It should be appreciated that the overall system architecture design of FIG. 2 may be in communication with any suitable video conferencing system, e.g., media transport server 130 of the video conferencing system depicted with reference to FIG. 1. The annotation management system of FIG. 2 is in communication with conference client 150 through media transport server 130. Conference client 150 may be configured as participants 122a-122n of FIG. 1. In addition, where conference client 150 represents multiple clients, each of the clients may be configured to execute the client application software configurations described with reference to FIG. 3. It should be appreciated that the annotation management system synchronizes annotations across all participants that are conversing.

Annotation management system 134 of FIG. 2 includes media management server 104. Media management server 104 includes web server module 106, meeting scheduling service module 108, annotation service module 110 and virtual pointer service module 112. In one embodiment, annotation service module 110 provides the functionality for a conference client to add annotation data during a videoconference session or view annotation data from a previously recorded videoconference session. Also included in annotation management system 134 is media analysis server 118, event database 114 and storage server 116. Media management server 104 manages and organizes the meeting, e.g., manages and organizes videoconference data for distribution among the participants of the meeting. Additionally, media management server 104 builds the database to manage the media and allow the meeting participants to retrieve the media data from storage server 182. Media management server 104 also retrieves the information from media analysis sever 118 and any modules for media playback and presentation. Media analysis server 118 performs the post-processing of the media data recorded during the videoconference session. Media analysis server 118 adds and retrieves information to event database 114, described in more detail below, to store the information for the media presentation and playback.

Storage server 116 is responsible for storing the media generated during a videoconference session that includes annotation data and virtual pointer data. For example, all sketches made during the meeting are captured and may be displayed as part of a meeting summarization. In one embodiment, the meeting summarization allows annotations to be viewed in the context of other events that take place during the meeting. In another embodiment, the annotation data will be stored on the storage server in vector format so that it can be scaled for display on devices of any output resolution.

As described with reference to FIG. 1, media transport server 130 handles the videoconference connections from the participants and combines the many incoming video and audio streams into a single output stream in the desired format for each participant/client. During a videoconference session, media transport server 130 communicates with media management server 104, informing the media management server of such details as when participants connect or disconnect.

Web server module 106 enables the downloading of any software code needed for participating or viewing the videoconference session. Meeting scheduling service module 108 enables a user to set up or join a videoconference session. That is, a user that desires to set up or join a videoconference session may do so through a web browser that may download hyper text markup language (HTML) type pages provided through web server module 106. Once the user has joined the videoconference session, software code may be downloaded from web server 106, e.g., software code related to client functionality after which the client begins communicating with media transport server 130. It should be appreciated that through meeting scheduling service module 108, media management server 104 connects to the appropriate media transport server to enables the video conference session. In another embodiment, since the videoconference session is stored, upon completion of the videoconference session a meeting summary may be created. The meeting summary may be accessed through web server 106. The meeting summary is an overview of the meeting that may be presented to a user so that the user may better decide whether to view the meeting or what portions of the meeting to view. It will be apparent to one skilled in the art that the meeting summary may be presented in any number of suitable manners. Furthermore, the stored annotation data and stored virtual pointer data may be incorporated into the meeting summary to more accurately portray the meeting summary.

Media management server 104 is in communication with media analysis server 118. In one embodiment, media management server 104 retrieves the information from media analysis server 118 and associated modules for media playback and presentation. Media analysis server 118 is in communication with event database 114 and storage server 116. As mentioned above, media analysis server 118 performs the post-processing of the media recorded during the meeting and analyzes the media to build information to be used for media presentation and playback. Media analysis server 118 may also add and retrieve annotation information to event database 114. In one embodiment, the annotation information is identified through the insertion of indices and markers into the stored videoconference data, thereby enabling reconstruction of the stored videoconference data based upon the annotation information. As used herein, annotation information may include virtual pointer information. Virtual pointer information may refer to mouse moves transmitted to media management server and then distributed out to participants so that each participant may view the mouse moving within the associated client display. It should be appreciated that annotation management information may be referred to as virtual ink. In another embodiment, the annotation information includes the data stored in event database 114 as discussed below.

Storage server 116 of FIG. 2 is configured to store media associated with the videoconference. Storage server 116 is responsible for storing any suitable media utilized for the videoconference session. In one embodiment, storage server 116 contains storage devices, such as hard drives, magnetic tapes, and DVD-Rom, etc. Access to the stored media may be provided through a set of application programming interfaces (APIs) defined for accessing the medias that may be retrieved from storage server 116 by other components in the system. In another embodiment, storage server 116 accepts network connections for users or participants of the videoconference to upload their medias. Exemplary mechanisms for uploading the media to the storage server include: Simple transport control protocol/Internet protocol (TCP/IP) socket connection, hypertext transport protocol (HTTP) file upload protocol, simple object oriented access protocol (SOAP/XML), and other suitable network transport protocols. Event database 114 of FIG. 2 stores annotation events occurring during the videoconference session. Exemplary annotation events include the following: the annotation start point, the annotation end point, an annotation clear page, the annotation data, user information associated with the annotation start and the annotation end, the annotation target, e.g., type of media, a target identifier, and other suitable annotation information. Additional information on the Annotation Management System may be found in U.S. patent application Ser. No. 10/440,526, filed on May 16, 2003, and entitled "Annotation Management System."

Figure 3:
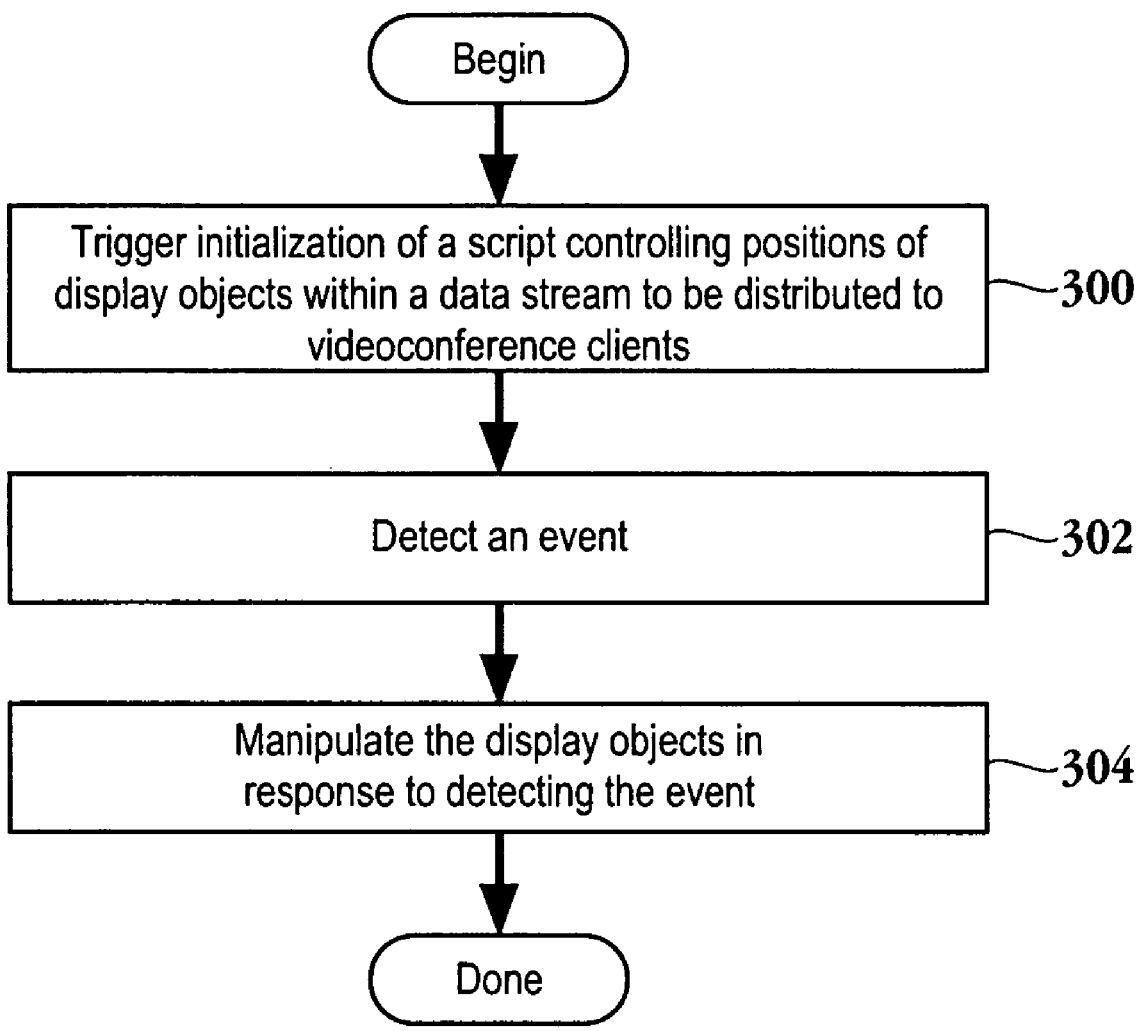
FIG. 3 is a flowchart diagram of the method operations for controlling mixing of data streams for a videoconference session in accordance with one embodiment of the invention.

FIG. 3 is a flowchart diagram of the method operations for controlling mixing of data streams for a videoconference session in accordance with one embodiment of the invention. The method initiates with operation 300 where the initialization of a script controlling positions of display objects within a data stream to be distributed to videoconference clients is triggered. An exemplary script is the script described above. The method then advances to operation 302 where an event is detected. The event may include a mouse click or some other suitable event as described above or listed in TABLE 1. In one embodiment, the event is initiated by a conference participant through a graphical user interface enabled through an editing engine on the client. This client event is then communicated through the back channel to the server. Of course, the event may be a server-based event also. The method then proceeds to operation 304 where the display objects are manipulated in response to detecting the event. Here, the script may change the mixing of the video streams in order to customize the display output. As mentioned above with reference to FIG. 1, the scripting system and the media mixer interact with the video object system in order provide a display layout selected by a participant. That is, the video object within the video object system is accessed and manipulated according to the script. The media mixer then configures the audio/video stream and performs any scaling or encoding as directed by the scripting system. The assembled audio/video stream is then communicated to the respective client.

When sharing documents in a videoconference, it is important that all the connected clients are able to view these documents. Not every client may have the ability to view certain proprietary formats. To compensate for potential shortcomings of a client, the documents are converted to a common image format. "Common image format" as used herein is an image file format that is accepted as a standard across a wide variety of Operating Systems and software packages. One example of a common image format is the Joint Photographic Expert Group (JPEG) format. As used herein, the phrase "common image format" and "JPEG" are interchangeable. It should be appreciated that this in no way limits the common image format to JPEG only. For example, other suitable common image formats include graphic interchange format (GIF), bitmap format (BMP), portable network graphics format (PNG), etc.

Figure 4:
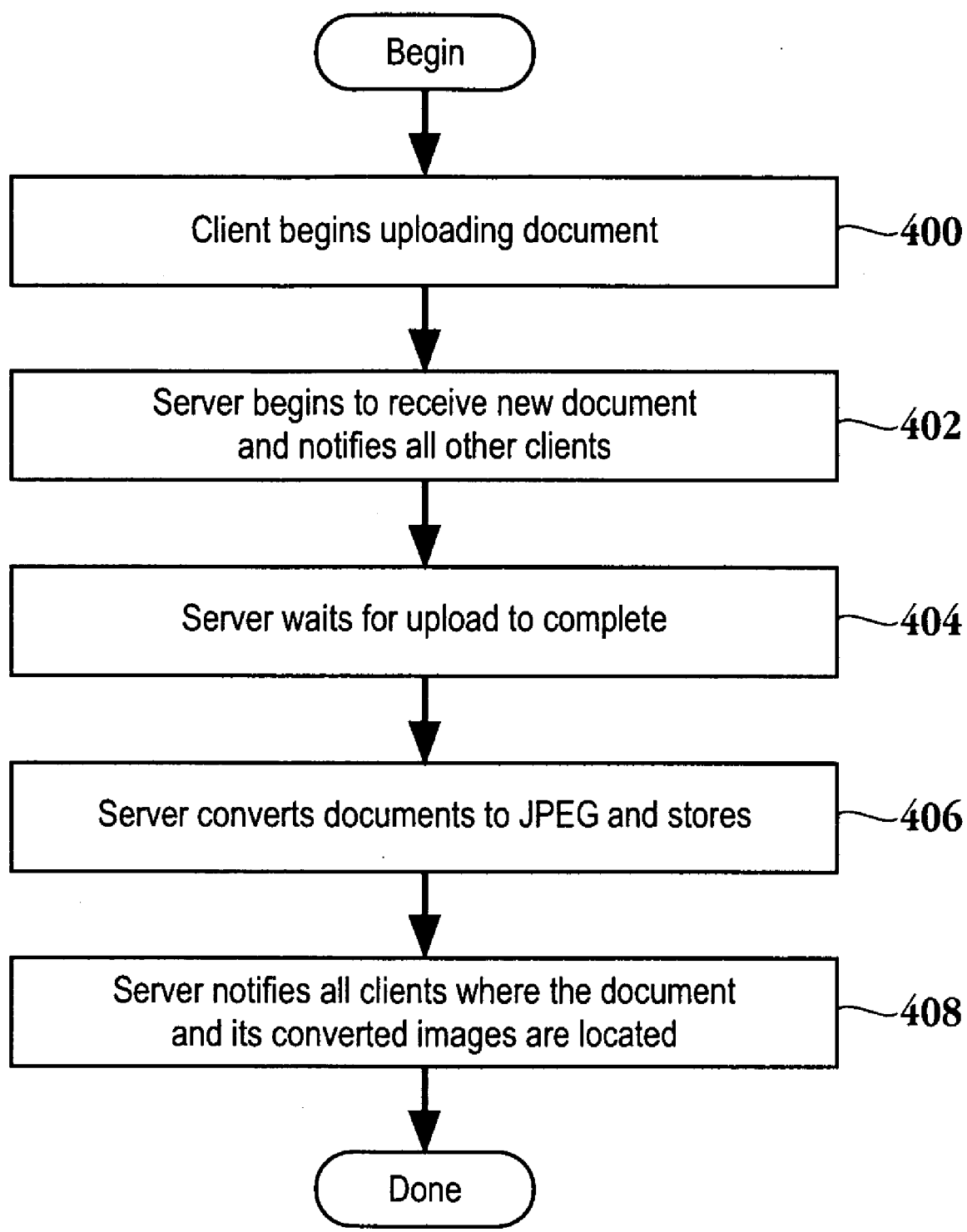
FIG. 4 is a flowchart illustrating the basic steps for uploading and storing a document using a common image format in accordance with one embodiment of the invention.

FIG. 4 is a flowchart illustrating the basic steps for uploading and storing a document using a common image format in accordance with one embodiment of the invention. The method initiates with operation 400 where the client begins uploading the document. When the server begins to receive a new document from one of the clients, the server assigns a unique identifier to this document. The server also tries to determine the number of pages contained in the document. Once these two pieces of information are determined, all the clients in the conference are notified that a new document has been added to the server in operation 402. It should be appreciated that the notification includes the unique identifier of the document and the number of pages. In one embodiment, the notification can also contain optional information, such as, file name, file size, etc. The upload operation is completed in operation 404.

Still referring to FIG. 4, once the server receives the entire document file, the file is converted to a JPEG format in operation 406. Of course, the document may be converted to another common image format as discussed above. The conversion of a multiple page document is done sequentially in one embodiment. That is, the first page is converted to JPEG, then the second page and so on. However, a request to view a document page that has not been converted to JPEG may be received at anytime. If the server has the full document, the requested page-may be converted to JPEG immediately, i.e., non-sequentially. Upon the successful conversion and storage of the document, all the clients are notified that the document is ready in operation 408. The notification contains the documents unique identifier, the number of pages and URLs of the original document file and its convert pages. The clients use some or all of this information when requesting to view the document and its converted pages.

Figure 5:
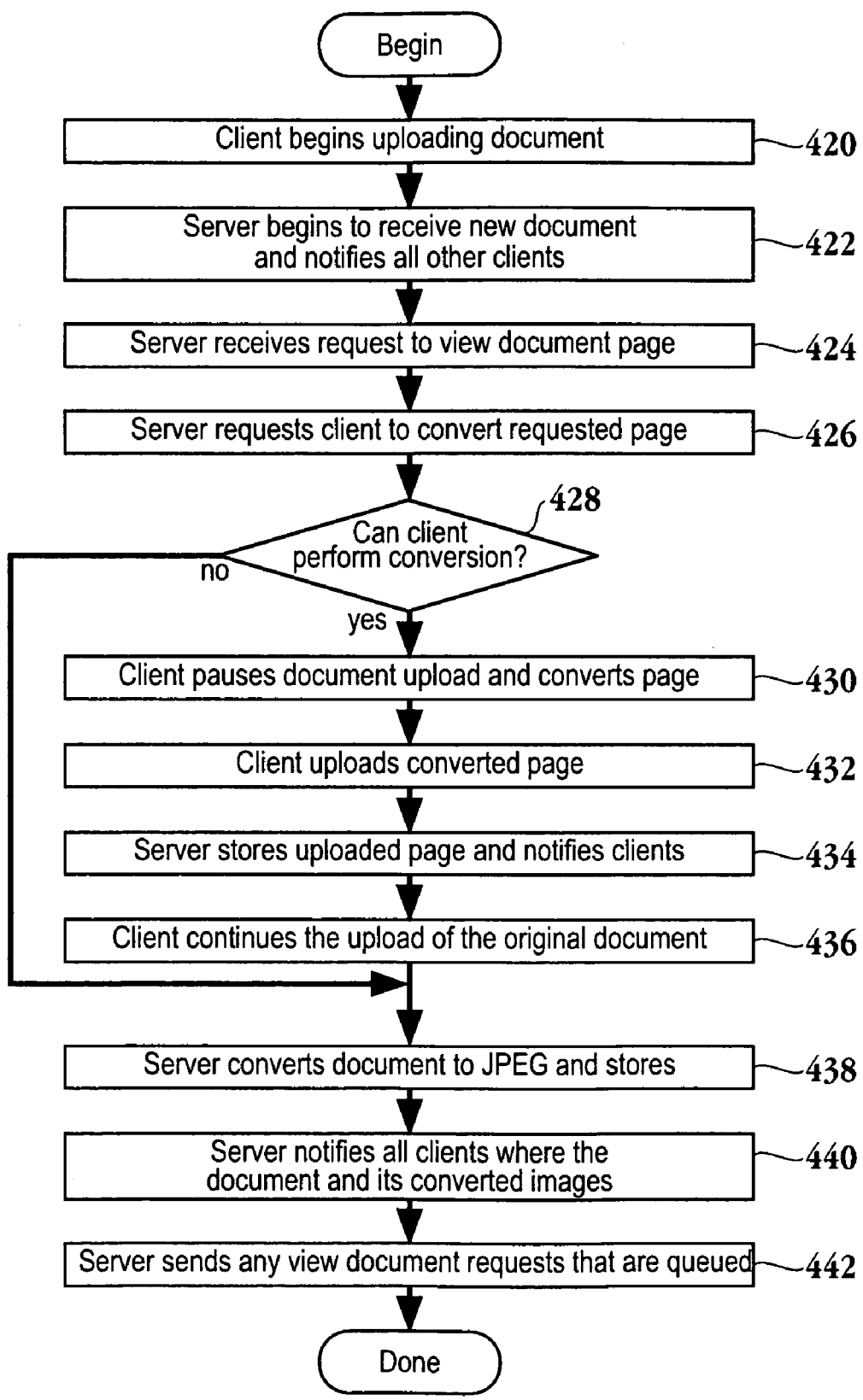
FIG. 5 is a flowchart diagram illustrating how a request to view a document is handled during the upload of a document in accordance with one embodiment of the invention.

FIG. 5 is a flowchart diagram illustrating how a request to view a document is handled during the upload of a document in accordance with one embodiment of the invention. Operations 420 and 422 of FIG. 5 are identical to operations 400 and 402, respectively, of FIG. 4. However, in FIG. 2, the server receives a request to view a page in the document before the entire document has been uploaded in operation 424. At this point, the server requests the uploading client to do the conversion of the page and upload the resulting image in operation 426. In decision operation 428, it is determined if the client can perform the conversion. If the client is unable to do the conversion, the request from the server is ignored and the method advances to operation 438 where the server converts the document to the common image format and stores the document in the common image format. Upon the successful conversion and storage of the document, all the clients are notified that the document is ready in operation 440. The method advances to operation 442 where the server fulfills any view document requests that are queued, i.e., may have accumulated during the conversion of the document.

If it is determined in decision operation 428 that that client can perform the conversion, then the method proceeds to operation 430 where the client pauses document upload and converts the page. In operation 432, the client uploads the converted page. The method then moves to operation 434 where the server stores the uploaded page and notifies the client. In operation 436, the client continues the upload of the original document. The method then advances to operation 438 and proceeds as described above. The method described with respect to FIGS. 4 and 5 enable the conservation of network bandwidth. This is accomplished by not forcing the clients to download a new document every time a new document is uploaded to the server. Instead, the client is notified of the new document and its location. When a request to the client to view a page in a document is received from the server, the client downloads and caches this page.

In addition, certain client configurations can optimize the perceived speed of document upload. For example, if the uploading client has the ability to render pages of a document to images, individual-page images could be generated and uploaded on-demand. While this would increase the total time/bandwidth of entire document upload, meeting participants would experience faster response to page changes while uploading is still taking place.

In summary, the above-described invention provides a client-server videoconferencing system having enhanced functionality for enabling a participant to control the mixing of input streams within a media mixer of a videoconference session. The videoconference server is configured to track events occurring during the meeting through client monitors in communication with the videoconference server over a back channel. Accordingly, these events may be used to trigger a script that changes video layouts and enables participants to select their own layout. Additionally, a scheme for converting videoconference documents to be shared during the conference session to a common format is also provided.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data that can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A videoconference system, comprising:
   a server component configured to distribute media to a plurality of clients, the server component including,
      a media mixer enabling distribution of composite audio/video data streams to the clients; and
      a video conference choreographer including an event based scripting system and a video object system;
   a conference channel communication connection over which video and audio data streams are carried between the plurality of clients and the server component; and
   a back-channel communication connection over which event data is communicated between the plurality of clients and the sewer component, wherein the scripting system controls the mixing by the media mixer of audio/video data streams based on the event data received from clients through the back-channel connection, and wherein the video object system stores video objects that are manipulated by the scripting system.

2. The videoconference system of claim 1, wherein each of the plurality of clients includes an editing engine enabling each of the plurality of clients to individually and dynamically customize display.

3. The videoconference system of claim 2, wherein the scripting system defines positions for objects within the composite audio/video data streams to the clients.

4. The videoconference system of claim 3, wherein the scripting system obtains the positions for the objects from the video object system control.

5. The videoconference system of claim 2, wherein the editing engine communicates the display layout to the server component through the back channel communication connection.

6. The videoconference system of claim 2 wherein the video object system is a database.

7. The videoconference system of claim 2, wherein the editing engine generates scripts based on the event data and communicates the generated scripts through the back channel to the scripting system.

8. The videoconference system of claim 1, wherein the event data originates from one of the plurality of clients and the event data is selected from the group consisting of a mouse click, a size change signal, a participant joining a conference session, and a participant leaving the conference session.

9. The videoconference system of claim 1, wherein the videoconference choreographer determines an appropriate scaling technique to be applied to video data transmitted to the plurality of clients.

10. The videoconference system of claim 1, wherein the videoconference choreographer limits motion between frames of video data transmitted to the plurality of clients in order to enhance video encoding.

11. The videoconference system of claim 1, wherein the videoconference choreographer is configured to designate a portion of a frame of the video data to be encoded according to a first quality level encoding scheme and a remainder of the frame of video data to be encoded according to a second quality level encoding scheme.

12. The videoconference system of claim 1, wherein the scripting system determines actions executed by the video conference choreographer and actions executed in native code by the media mixer to improve resource utilization.

13. The videoconference system of claim 1, wherein a foreign function interface in the video conference choreographer allows the media mixer to add internal media mixer structures to the scripting system, wherein the scripting system manipulates the internal media mixer structures.

14. The videoconference system of claim 1, wherein the videoconference choreographer switches scaling algorithms when motion is detected.

15. The videoconference system of claim 1, wherein the videoconference choreographer considers an outgoing bandwidth of a network connection to determine compression.

16. The videoconference system of claim 1, wherein the videoconference choreographer changes a collaboration model of the videoconference allowing a presenter to control client displays.

* * * * *

UNITED STATES PATENT AND TRADEMARK OFFICE
CERTIFICATE OF CORRECTION

| | | |
|---|---|---|
| PATENT NO. | : 7,499,075 B2 | Page 1 of 1 |
| APPLICATION NO. | : 10/952053 | |
| DATED | : March 3, 2009 | |
| INVENTOR(S) | : Sean Miceli | |

It is certified that error appears in the above-identified patent and that said Letters Patent is hereby corrected as shown below:

Column 17, line 37 after "customize display" insert --layouts--

Signed and Sealed this

Thirtieth Day of June, 2009

JOHN DOLL
*Acting Director of the United States Patent and Trademark Office*